United States Patent [19]
Braun et al.

[11] Patent Number: 5,335,022
[45] Date of Patent: Aug. 2, 1994

[54] HIGH-CONTRAST FRONT PROJECTION VIDEO DISPLAY SYSTEM

[75] Inventors: David A. Braun, Denville; Terence J. Nelson, New Providence; Lanny S. Smoot, Morris Township, Morris County, all of N.J.

[73] Assignee: Bell Communications Research, Inc., Livingston, N.J.

[21] Appl. No.: 126,150

[22] Filed: Sep. 23, 1993

Related U.S. Application Data

[63] Continuation of Ser. No. 830,172, Jan. 31, 1992.

[51] Int. Cl.⁵ .......................... H04N 5/74; H04N 9/31
[52] U.S. Cl. .................... 348/744; 348/752; 348/756; 348/757; 353/20
[58] Field of Search .................... 358/231, 232, 60, 61, 358/62, 63, 233, 250, 251, 252, 59; 353/20, 81, 122, 38; 357/462, 48, 40, 41, 63, 69, 70; 348/780, 739, 744, 750, 751, 752, 761, 762, 766, 767, 790, 794, 756, 757, 776, 777, 778, 779; H04N 5/74, 9/30, 9/31

[56] References Cited

U.S. PATENT DOCUMENTS

| | | | |
|---|---|---|---|
| 4,577,928 | 3/1986 | Brown | 358/252 |
| 4,928,122 | 5/1990 | Takafuji | 353/20 |
| 4,974,946 | 12/1990 | Solomon | 359/462 |
| 5,075,789 | 12/1991 | Jones et al. | 359/48 |
| 5,099,343 | 3/1992 | Margerum et al. | 359/63 |
| 5,115,305 | 5/1992 | Baur et al. | 358/60 |
| 5,267,029 | 11/1993 | Kurematsu et al. | 358/61 |

FOREIGN PATENT DOCUMENTS

| | | | |
|---|---|---|---|
| 0064483 | 3/1988 | Japan | H04N 5/74 |
| 0267089 | 11/1988 | Japan | H04N 9/30 |
| 0089316 | 4/1991 | Japan | 358/231 |

OTHER PUBLICATIONS

"Stereoscopic Large Screen Displays Using Liquid Crystal Light Valve Projectors," J. M. Haggerty et al., SPIE vol. 1255, Large-Screen Projection Displays II, pp. 114–122, 1990.
"Super Wonder-Lite, DA-Lite Products Brochure", Feb., 1990, p. 4.
"Multilayer Polarizers and Their Applications to General Polarized Lighting", Alvin M. Marks, Feb. 1959.
"High Definition TV Rear Projector Using LCD Panels", Yokozawa et al, CH-3071-8/91/0000-0004, pp. 4–7, IEEE, 1991.
"Polarization Brings Conservation to Lighting", Los Angeles Times, Sep. 10, 1990.
"Large Screen Electro-Stereoscopic Displays", Lenny Lipton, SPIE vol. 1255, Large-Screen Projection Displays II, pp. 108–113, 1990.

*Primary Examiner*—James J. Groody
*Assistant Examiner*—Michael H. Lee
*Attorney, Agent, or Firm*—Leonard Charles Suchyta; Loria B. Yeadon

[57] ABSTRACT

A front projection video display system achieves high contrast without darkened ambient room conditions by a specific combination and arrangement of the components of this system. These components include a front-projection video projector which projects an image of particular direction of polarization; polarizing lenses which polarize light radiated from room light fixtures in a direction orthogonal to that of the projected image; a polarizing filter which substantially transmits light polarized parallel to the projected image and substantially blocks light orthogonal to the projected image; and a projection screen which is polarization maintaining and which receives the projected image for viewing by the viewing audience.

9 Claims, 4 Drawing Sheets

HIGH-CONTRAST FRONT PROJECTION VIDEO DISPLAY SYSTEM

This application is a continuation of application Ser. No. 07/830,172, filed Jan. 31, 1992.

FIELD OF INVENTION

This invention relates to a video display system, and specifically to a high-contrast video display system employing a front projection video projector.

BACKGROUND OF THE INVENTION

Many computer image, entertainment video, and video teleconferencing services require large-screen displays so that users can realize the maximal benefit and effectiveness of these services. A particular concern with large display screens, especially in residential environments, is the volume of living space encroached upon by the video display screen. A solution to this problem would be a true large-screen flat display having negligible depth that can be hung inconspicuously on the wall. This solution, although under research for many years, remains decidedly elusive.

Another approach is the use of rear-projection television (RPTV) receivers which are currently available in the consumer market. RPTV receivers provide reasonable brightness and are somewhat tolerant to ambient room light while still producing good contrast. However, these receivers are large in size, and significantly encroach on the volume of living space, especially for enhanced quality video formats.

Another approach to large screen video displays, which minimizes the apparent loss of living space, is front projection systems. A front projection system displays an image by directing the projected light from the projector onto a projection screen which diffusely reflects the light back into the viewing area.

The most pronounced advantage of front projection systems is that the video projection screen, which is a thin, wall-mountable unit, is separate from the video projector, which can be mounted in various positions within the room, thus lessening the apparent loss of living space. Front projection systems will be even more desirable as alternate video projector technologies such as liquid crystal, deformable media or laser projection technologies are employed. By employing these technologies, the projector will shrink to an insignificant size, and the entire arrangement will approach the effectiveness and level of user comfort of a single flat-screen video display. Furthermore, in shrinking the size of the projector, it can be suspended conveniently from the ceiling of the viewing room for maximized living space and with the additional advantage that people are somewhat less likely to block the projected light as they move about the viewing room.

A significant disadvantage of prior front projection systems is the need for a darkened room in order to achieve tolerable contrast. A darkened room is required since light from the projector as well as ambient room light is efficiently returned by the display system, thereby yielding poor contrast to the viewer. Under normal room lighting conditions, the picture quality of front projection systems is poor compared to rear projection systems. Therefore, persons skilled in the art have expressed a preference for rear projection video display systems, especially for home use. See for example, *High Definition TV Rear Projector Using LCD Panels*, Yokozawa et al., CH-3071-8/91/00000-0004, pgs. 4-7, IEEE, 1991.

Ideally, while watching the video imagery of a front projection video system, viewers do nothing else requiring lighted ambient conditions and are content in a darkened room. However, this is not the reality. While watching a video display, viewers may be engaged in other activities which require lighting. Examples of such activities are reading television program listings, denoting the time, conversing with other viewers, etc. Furthermore, during video teleconferencing sessions, illumination of the conferees is needed by the monitoring cameras.

An object of our invention is to provide a front projection video display system, which yields high contrast without requiring darkened ambient conditions and minimizes the encroachment on the volume of living space unlike conventional rear projection visual display systems.

SUMMARY OF THE INVENTION

The above and other objects of our invention are attained by a combination of individual components which interact to achieve a front-projection video display system with high contrast without requiring darkened ambient room conditions. In accordance with our invention, this system comprises a particular front-projection video projector, a polarization maintaining projection screen, a polarization filter, and polarizing lenses which cover the room lights.

The video projector generates an image to be projected onto the projection screen. The projected image is comprised of three different color sub-images, which, in accordance with an aspect of our invention, are manipulated such that all sub-images are aligned to a particular direction of polarization.

In addition to the projected image from the video projector, ambient light radiated from light fixtures within the viewing room also impinges on the projection screen, and this light threatens to significantly reduce the contrast and overall performance of the display system. To diminish the negative effects of ambient room light, our inventive display system employs polarizing lenses which cover the room light fixtures and polarize the light radiated from the fixtures in a direction orthogonal to the direction of polarization of the image projected from the video projector.

Prior to being received at the projection screen, the projected image and ambient light, which is radiated from room light fixtures and transmitted by the polarizing lenses, encounter a polarizing filter located in front of the projection screen. The polarizing filter is polarized parallel to the direction of polarization of the projected image and orthogonal to the direction of polarization of the ambient light. Therefore, the projected image is substantially transmitted by the polarizing filter, but the ambient light is substantially blocked, thereby increasing the ratio of the projected image to the ambient light impinging on the projection screen for improved contrast.

The projection screen is polarization-maintaining and angle selective; therefore, light impinging on the screen is reflected with the same direction of polarization and at substantially the same angle at which it was received. Upon being reflected from the projection screen and, once again, encountering the polarization filters, the projected image and the ambient light having a direction of polarization parallel to the filter are passed to the viewing audience.

As a result of this system of cooperating components, high-contrast is achieved for a front-projection video display system without requiring darkened ambient room lighting conditions. Furthermore, since our front projection system overcomes poor contrast which has long limited the practical application of conventional front-projection systems under lighted ambient conditions, a user of our system can fully benefit from the inherent advantages of front-projection systems. Specifically, front-projection systems impose little infringement on the volume of living space within the viewing room; therefore, our inventive system presents a viable alternative to rear-projection systems, which are undesirable due to their encroachment on living space.

DETAILED DESCRIPTION

A prime objective of our invention is to achieve a high contrast front-projection video display system without requiring darkened ambient room conditions. Our invention attains this objective by a system comprising a combination of components which are assembled together in a viewing room. These system components cooperate to combat poor contrast which is inherent in conventional front projection video systems in undarkened ambient conditions.

Figure 1:
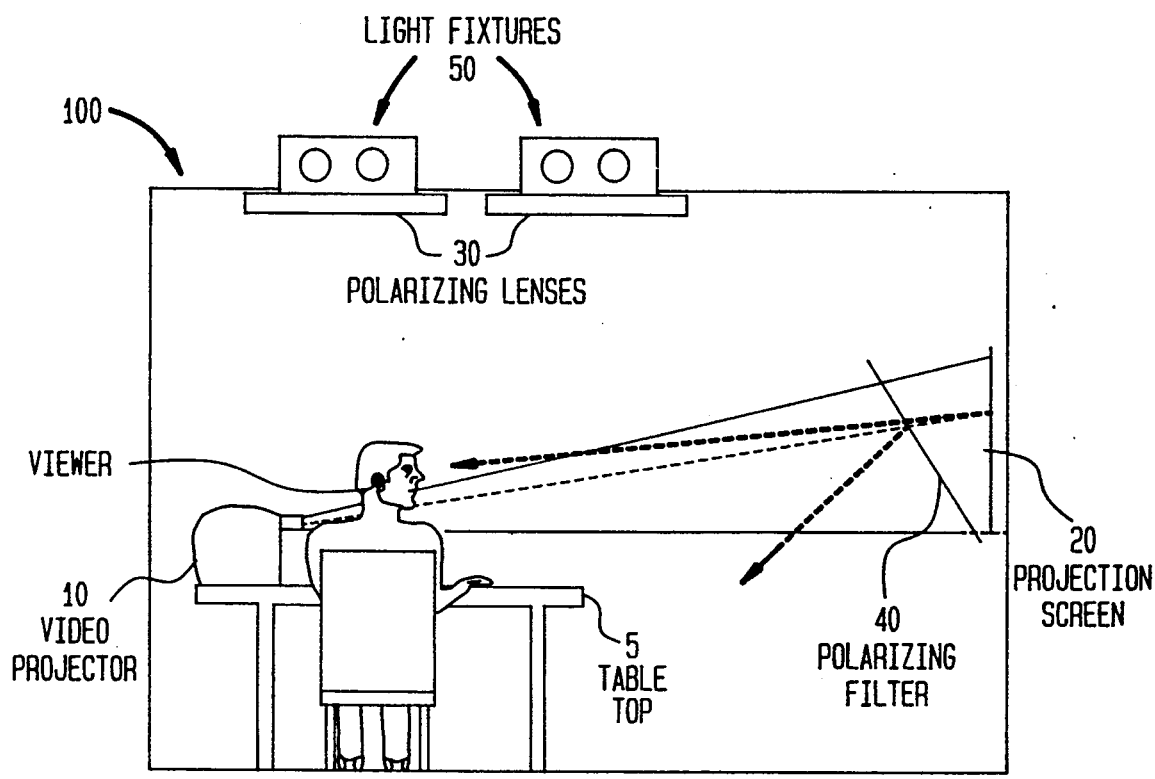
FIGS. 1 and 2 depict embodiments of a high contrast front-projection video display system in accordance with our invention where the video projector is mounted on the table top and on the ceiling, respectively.
Figure 2:
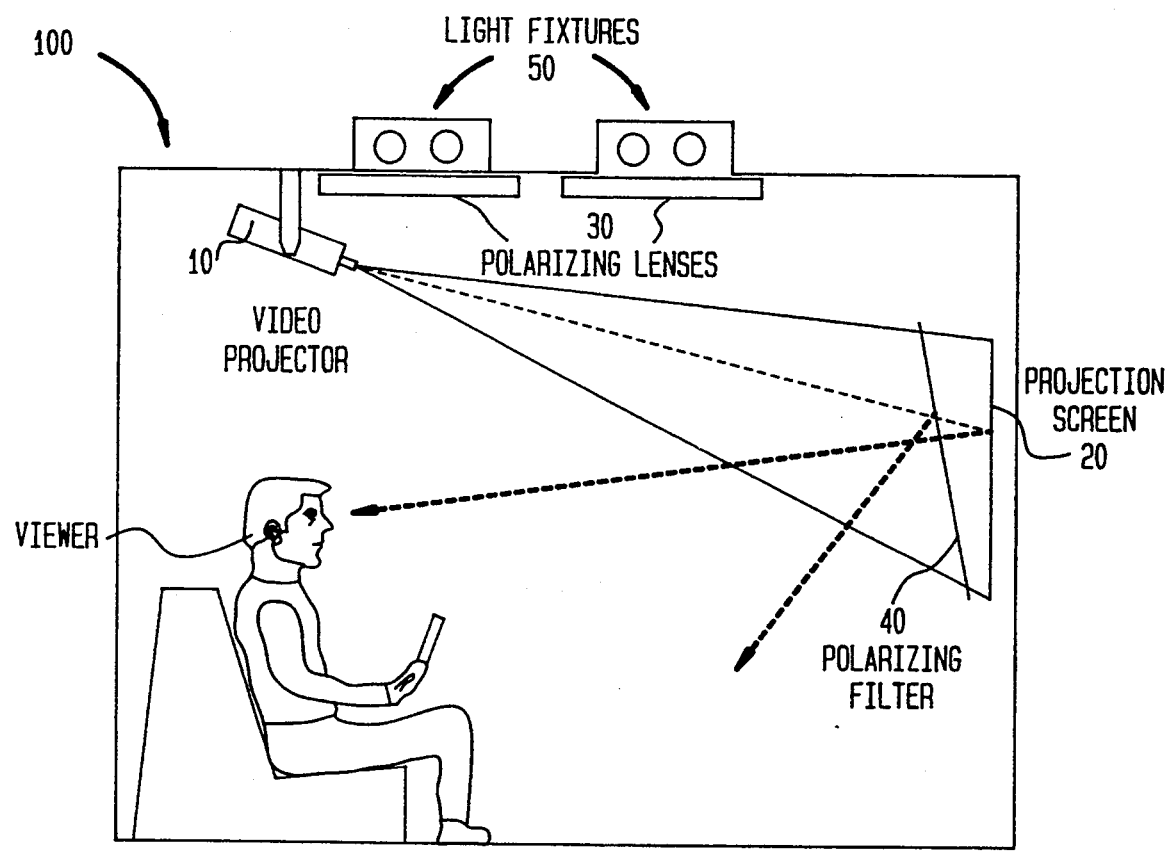

Specific illustrative embodiments of a high contrast front projection video display system 100 of the present invention are depicted in FIGS. 1 and 2. Our invention overcomes the poor contrast limitations of conventional front projection systems in the presence of undarkened ambient conditions since the components of our system cooperate with one another and, in combination, form a unique structure which processes light passing in the system for high contrast.

Contrast is a measure of performance for video display systems and represents the ratio of the brightnesses of the brightest and darkest portions of an image as seen on the screen. The main harmful effect of ambient light is to increase the brightness of the dark portion of an image many times over, thereby greatly reducing the contrast ratio.

In the system shown in FIG. 1, light is radiated from a front projection video projector 10, which illustratively (and appropriately for teleconferencing) is located on the table top 5. As shown in FIG. 2, the projector 10 may also be mounted on the ceiling. This projector 10 produces a projected image which ultimately is to be viewed by the viewing audience. The projected image is comprised of three sub-images (namely red, blue, and green) which may have different directions of polarizations with respect to one another and to the vertical and horizontal directions. This projector is similar to those commercially available, but, in accordance with our invention, produces a projected image in which all sub-images are substantially aligned to a particular direction of polarization, which illustratively is the horizontal direction. A discussion of the modifications implemented in the projector 10 of our invention are discussed in more detail in Section A below.

Upon exiting the projector 10 and being projected toward the projection screen 20, the projected image is horizontally polarized. In addition to the projected image, other ambient light radiated from room light fixtures 50 also impinges upon the projection screen 20 (see Section B below). To permit discrimination between the projected image and the light radiated from light fixtures 50, in accordance with our invention, polarizing lenses 30 are employed which cover the light fixtures 50. The polarizing lenses 30, which are discussed in Section D below, transmit light from the light fixtures 50 that is polarized in a direction orthogonal to the direction of polarization of the projected image. For purposes of this discussion, light from the light fixtures 50 that is substantially vertically polarized is transmitted by the polarizing lenses 30.

Additionally, because the polarizing lenses 30 transmit vertically polarized light, they produce less glare on glossy surfaces. Because the vertically polarized light is easier to read by, the ambient illumination can be lowered while maintaining ease of reading. *Polarization Brings Conservation to Lighting*, Los Angeles Times, Sep. 10, 1990. The permitted reduction is considered so great by some that the electrical power consumed by lighting systems can be reduced. This reduction in ambient lighting also contributes to the overall increase in contrast of front-projected images.

Prior to being received at the projection screen 20, the projected image, which is horizontally polarized, and ambient light radiated from the light fixtures 50 and passed by the polarizing lenses 30, which is vertically polarized, encounter a polarizing filter 40 (discussed in Section C below). The polarizing filter 40 is a sheet polarizer, located in front of the projection screen 20 and specifically discriminates between the projected image and ambient light such that only light substantially aligned to the direction of polarization of the projected image is passed while other light is rejected.

To perform such a discriminatory function, the polarizing filter 40 has a direction of polarization parallel to that of the projected image and orthogonal to that of the ambient light. Therefore, upon encountering the polarizing filter 40, the projected image is substantially transmitted, and the orthogonally-polarized ambient light is substantially rejected.

At the projection screen 20, light passed by the polarizing filter 40 is received and reflected to the viewing audience. To ensure that the projected image is maximally reflected to the viewing audience on its return trip through the polarizing filter 40, the projection screen 20 is polarization maintaining. Therefore, essentially all light received at the projection screen 20 is reflected at substantially the same polarization at which it was received. Upon returning to the polarizing filter 40, the projected image is passed to the viewing audience along with any extraneous ambient light which happens to be polarized parallel to the polarizing filter 40.

Below in Sections A through D, each of the system components comprising our high contrast front projection video system is discussed followed by an assessment of the improvement in contrast achieved by our system in Section E.

A. Front-Projection Video Projector

The front projection video projector 10 employed in a specific illustrative embodiment of our inventive system was a Sharp XV-100 liquid crystal video projector. This projector has an active-matrix liquid crystal panel, which defines each of three color sub-images (blue, red, and green). The combination of these sub-images form the projected image which is to be viewed by the viewing audience.

Figure 3:
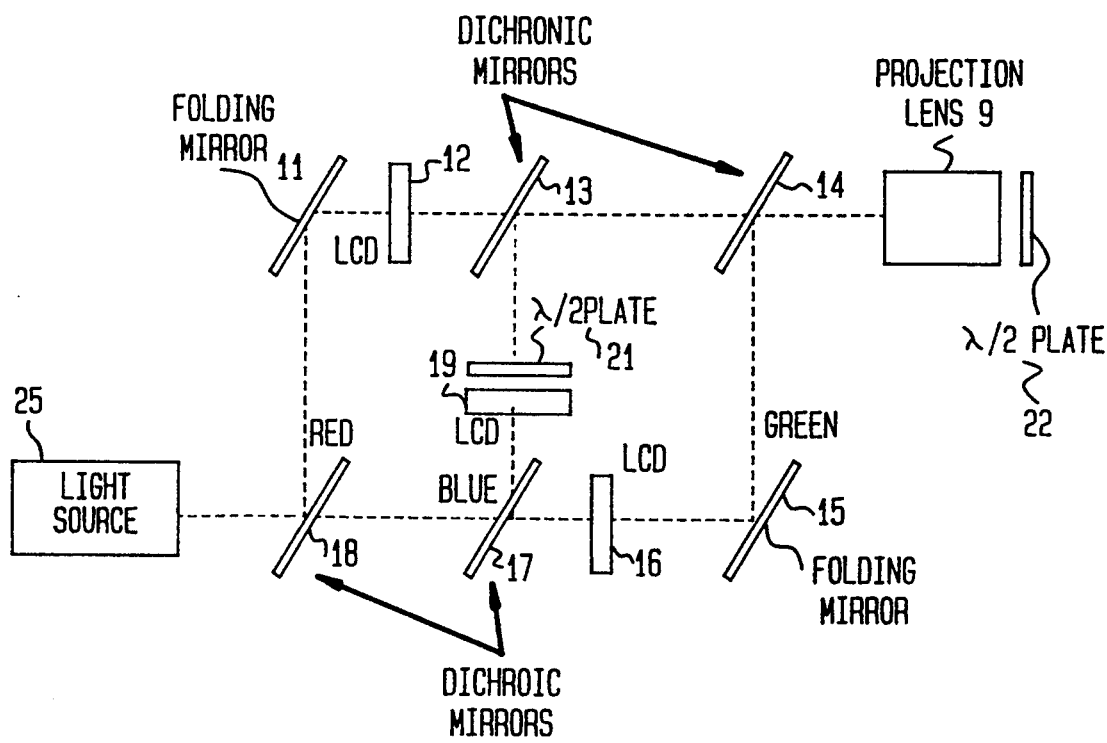
FIG. 3 depicts the configuration of dichroic and folding mirrors and LCD slides in the front projection video projector in accordance with an aspect of our invention.

To separate and combine these sub-images, the projector employs dichroic mirrors 13, 14, 17, and 18, and folding mirrors 11 and 15 as shown in FIG. 3. LCD slides 12, 16, and 19 are used to modulate the sub-images, and each LCD slide has input and output polarizers laminated onto its outer surfaces. These polarizers are aligned at right angles to each other and at 45 degrees to the rows and columns of the LCD. Consequently, the three sub-images of the projected image are polarized 45 degrees to the horizontal and vertical.

In principle, all sub-images could have the same direction of polarization after modulation. However, current manufacturing practice is simplified if the blue modulator is reversed, which causes the blue sub-image to be polarized orthogonal to the red and green sub-images. This is because the blue sub-image, in being transmitted to the projection lens 9 from the light source 25, is once mirrored at dichroic mirror 13 after being modulated at LCD slide 19. Each time a modulated sub-image is mirrored, its direction of polarization changes by 90 degrees. Therefore, in being once mirrored, the blue sub-image experiences a change of polarization of 90 degrees. Conversely, the red sub-image passes straight through to the projection lens 9 unmirrored after being modulated at LCD slide 12, and the green sub-image is twice mirrored, once at the folding mirror 15 and once at the dichroic mirror 14 after being modulated at LCD slide 16, thus returning it to its original polarization.

To align these sub-images to the desired direction of polarization, which illustratively is the horizontal direction, we have employed a first and a second half wave plate 21 and 22. The first half-wave plate 21 is located between LCD slide 19 and dichroic filter 13 in the path of the blue sub-image, and this plate 21 rotates the blue sub-image into agreement, in terms of polarization, with the red and green sub-images. As previously stated, the axes of the polarizers laminated on the LCD slides are at 45 degrees to the vertical and horizontal, thereby causing the sub-images to be 45 degrees to the horizontal and vertical directions. The second half-wave plate, which is placed over the projection lens 9, is used to perform a final rotation of the aligned sub-images to the horizontal direction of polarization.

As a result of these modifications to the conventional front projection video projector, a projected image having a particular direction of polarization is produced. There are front projection video projectors currently available which output a projected image having aligned sub-images. If such a projector is employed, the first wave plate 21 is not required; however, the second wave plate may still be required if the direction of polarization of the projected image is not oriented to the desired direction of polarization.

B. Projection Screen

In this illustrative embodiment of our invention, a projection screen 20 that maintains the polarization of the light impinging on the screen is employed. An example of such a screen is manufactured by Da-Lite Screen Company and called "Super Wonder-Lite". *DA-LITE Products Brochure*, February, 1990, pg. 4. This screen has a lenticular pattern embossed into an aluminized vinyl and textile laminate. Although not an advertised characteristic, the most outstanding aspect of this screen for use in our system is that it preserves the direction of polarization of light projected upon it to a high degree. The polarization maintaining characteristics of standard hard concave projection screens having aluminum coated surfaces have been acknowledged in stereoscopic display technology. *Large Screen Electro-Stereoscopic Displays*, Lenny Lipton, SPIE Vol. 1255 Large-Screen Projection Displays II, pgs. 108–113, 1990. *Stereoscopic Large Screen Displays Using Liquid Crystal Light Valve Projectors*, J. M. Haggerty et al., SPIE Vol. 1255 Large-Screen Projection Displays II, pgs. 114–122, 1990.

Light transmitted by the polarizing filter 40 of FIG. 1 or FIG. 2 and other extraneous light entering around the filter are received at the projection screen 20 and reflected with the same direction of polarization with which they were received. Extraneous light could be prevented from entering around the polarizing filter 40 by covering the openings between the polarizing filter 40 and the polarization screen 20 with an opaque, light-blocking material (not shown).

The projected image and ambient room light initially transmitted by the polarizing filter 40 will also be transmitted on returning through the polarizing filter 40 since the direction of polarization of these signals is preserved at the projection screen 20. Because the projection screen 20 reflects the projected light into a narrow range of angles in the vertical plane, it can achieve significantly better contrast in an undarkened room compared to a matte surface. However, its polarization maintaining feature permits the intensity of the components of light transmitted by the polarizing filter 40 to remain essentially constant on the round trip between the polarizing filter 40 and the projection screen 20.

Such stability in light intensity may not be realizable in systems employing projection screens which are not polarization maintaining. Projection Type Liquid Crystal Display Device, Y. Takafuji, U.S. Pat. No. 4,928,123, May 22, 1990. In such systems, at the projection screen, the direction of polarization of the projected image and ambient light is randomly re-distributed; therefore, upon returning through the polarizing filter 40, portions of the projected image and the ambient light, which have been altered such that they are no longer aligned with the direction of polarization of the filter, are blocked. This random re-distribution of polarization may result in a significantly lower brightness than is otherwise achievable by our proposed system, which employs a polarization maintaining screen.

Figure 4:
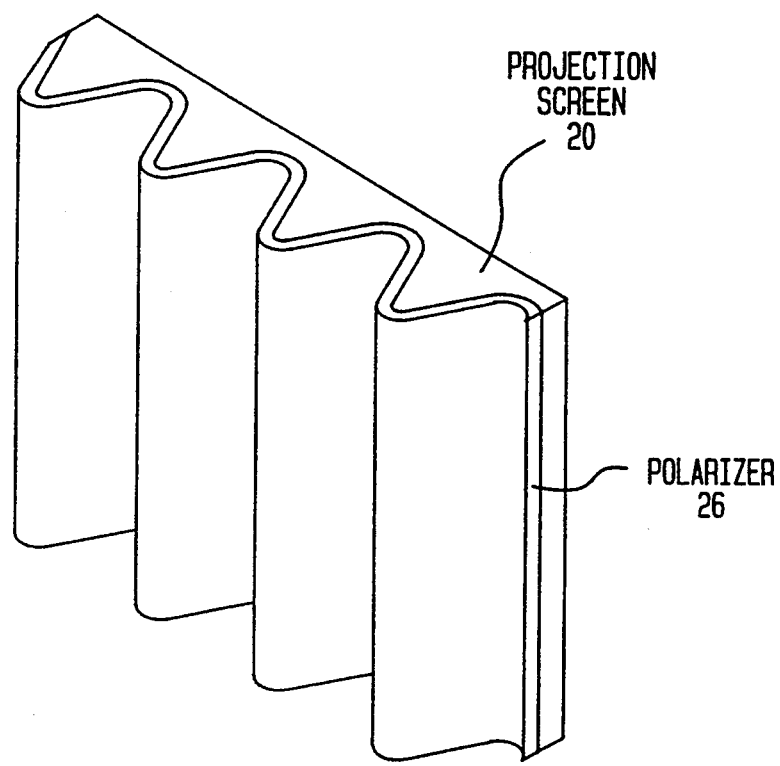
FIG. 4 shows the vertically-corrugated structure of a commercially available type of projection screen which is polarization maintaining with a polarizer laminated onto it.

The projection screen 20 employed in our invention advantageously has a vertically corrugated structure, as shown in FIG. 4, which spreads out the horizontal viewing angle range to about 70 degrees. The vertical viewing angle range is narrower, and the projector and viewer ideally should be seated equally above and below the center of the screen. The reflecting characteristic in the vertical plane increases the brightness of the projected image and reduces the amount of ambient light directed back to the observer.

Ideally, the projection screen 20 would have a polarizer 26 laminated onto it, which would eliminate the need for a separate polarizing filter 40 as described in Section C below. Because a separate polarizing filter 40 tends to reflect some of the light that impinges on it, the structure of FIG. 4 has a great advantage. The laminated polarizer reflects light as does the screen. If the laminated polarizer follows the surface of the screen faithfully, a second image will be formed which adds to the main image provided the thickness of the laminated polarizer will be small compared to the minimum resolvable features of projected images.

While this represents a minor addition to the brightness of the projected image, it eliminates the specular reflection of the bright projection lens that would be seen in a separate sheet polarizer. Other methods of dealing with the reflection are described in Section C below.

C. Polarizing Filter

The polarizing filter 40 is the discriminating mechanism employed in our system to transmit the projected image, which is horizontally polarized, to the projection screen 20 and to block ambient light, which is vertically polarized, from the projection screen 20. In an illustrative embodiment, the polarizing filter employed within our system was a linear polarizer (Polariod HN38S) having high efficiency and a good extinction ratio from 675 to 450 nm. The extinction ratio is a measure of the effectiveness of a polarizer, which is equal to the ratio of incident light passed when two such polarizers are aligned, to the amount of incident light that leaks through two such polarizers when they are crossed.

Illustratively, the polarizer can be mounted in a frame and hung in close proximity to the projection screen 20. Specifically, the top of the frame could be hung from the keystone corrector, a rod protruding from the top of the tripod holding the projection screen 20, and the bottom of the frame could be affixed to the screen case to keep the frame close to the screen at the bottom. The keystone corrector can separate the polarizing filter 40 from the top of the screen by several inches (up to 14 inches) and permit the screen to be tipped out at the top as seen in FIGS. 1 and 2, to accommodate seated viewers and to prevent bright reflections of the projector 10 at the polarizing filter 40 from being reflected directly toward the viewing audience.

By tipping the polarizing filter 40, the negative effects of bright reflections are reduced since the bright reflections are angled toward the floor and away from the viewing audience. Another approach to diminishing bright reflections at the polarizing filter 40 emanating from the projector 10 and other reflective surfaces in the room is to employ a polarizing filter 40 having an antireflection coating.

D. Polarizing Lenses

Another aspect of the viewing room that is considered in our system approach to achieving a high contrast front projection video display system is the ambient light radiated from light fixtures within the room. The greater the ambient light received at the projection screen, the poorer the contrast. To reduce the negative effect of ambient light on the contrast of the video display while still providing adequate room lighting, polarizing lenses 30 are employed to cover the room light fixtures 50 and pass ambient light that is vertically polarized, while reflecting back into the fixture ambient light that is horizontally polarized.

Light radiated from the room fixtures 50 is unpolarized, thereby having equal vertically and horizontally polarized components. If this light is projected toward the projection screen 20 without being filtered by the polarizing lenses 30, then half of the ambient light which is vertically polarized would be rejected while the other half which is horizontally polarized would be transmitted to the projection screen along with the projected image. Therefore, an improvement in contrast by only a factor of two could be realized.

However, by employing polarizing lenses 30 in cooperation with the aforementioned elements of our invention, a far greater improvement in contrast may be achieved. The polarizing lenses 30 are polarizing filters which operate on ambient light radiated from light fixtures by transmitting into the viewing room the ambient light which is vertically polarized and reflecting back into the fixtures 50 light which is horizontally polarized. Therefore, ambient light that is directed toward the projection screen 20 will be blocked at the polarizing filter 40. Since the ambient light is orthogonally polarized to the polarizing filter 40, a significant improvement in contrast may be achieved.

Figure 5:
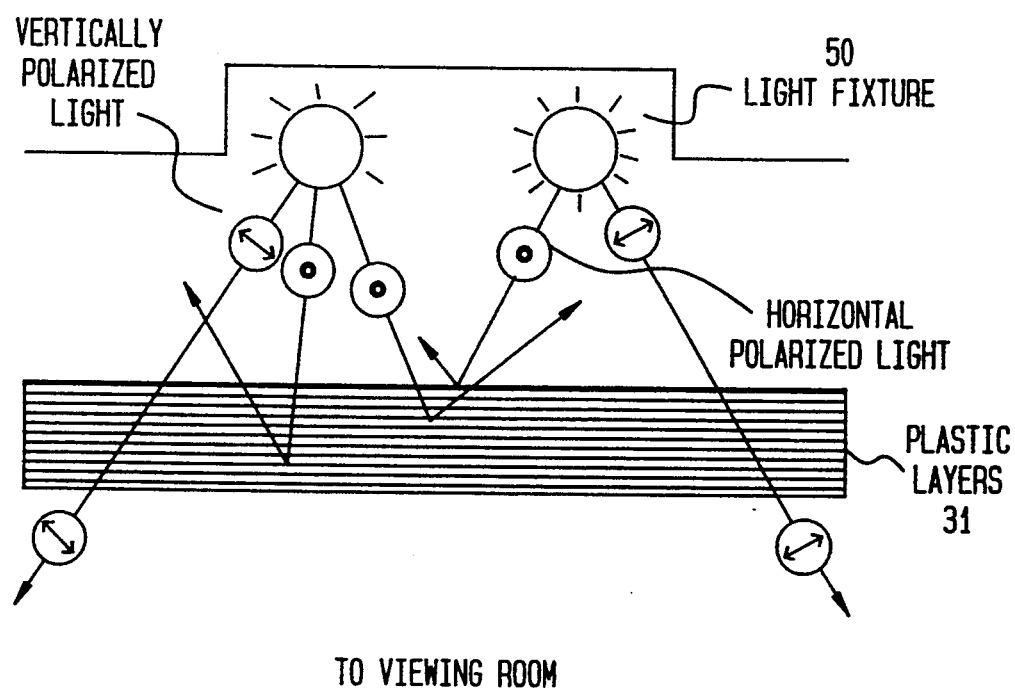
FIG. 5 depicts the structure of polarizing lenses which polarize light radiated from light fixtures within the viewing room in accordance with an aspect of the present invention.

Our invention employs polarizing lenses 30, which for use in embodiments of our invention as depicted in FIG. 5, are advantageously comprised of multi-layers of plastic 31. Each layer partially polarizes the light radiated from the fixture and multiple layers enhance the effect. Therefore, the net effect is that vertically polarized light is transmitted into the viewing room and horizontally polarized light is reflected back into the fixture. Actually, light referred to as vertically polarized is polarized in a plane defined by the path from the light source and an intersecting vertical line, but such light will also be blocked by a vertical polarizer oriented to absorb light traveling through it with truly vertical polarization. Because half of the light is reflected into the fixture, it appears that the illumination within the room would be significantly decreased. However, some of the light that is reflected into the fixtures is recycled and converted to a vertical polarization. The converted light is then transmitted out of the light fixture into the viewing room.

Multi-layers of plastic 31 are advantageously used as the polarizing lenses 30 in our front projection video display system because they offer an economical alternative to conventional linear polarizers which are expensive, light absorbing, and difficult to orient properly with respect to the projection screen. While multi-layers of plastics have been employed as covers for light fixtures, such use has been for glare control, not for polarization filtering. "Polarization Brings Conservation to Lighting", *Los Angeles Times*, Sep. 10, 1990. *Multilayer Polarizers and Their Applications to General Polarized Lighting*", Alvin M. Marks, February 1959. Within our invention, the multi-layers of plastics are employed to permit the light radiated from light fixtures to cooperate with other aspects of the viewing room to produce a high contrast front projection video display system.

E. Assessment of Contrast Improvement

An assessment of the contrast performance achievable by our front-projection video display system as compared to other front projection systems is provided below. Considering a conventional front projection display system set-up consisting of a video projector and a projection screen wherein maximum and minimum brightnesses of the projected image on the screen with no ambient light are $B_0$ and $B_1$, respectively, the contrast ratio ($CR_1$) is as described in EQ. (1) below.

$$CR_1 = \frac{B_0}{B_1} \qquad (1)$$

Therefore, EQ. 1 describes the level of contrast ideally achievable under darkened ambient conditions. However, assuming that unpolarized ambient light radiated from light fixtures 50 increases the brightness of the screen by the quantity $B_3$, thereby causing undarkened ambient conditions, the contrast ratio ($CR_2$) is mathematically described as in EQ. (2).

$$CR_2 = \frac{B_0 + B_3}{B_1 + B_3} \qquad (2)$$

By adding a polarizing filter 40 between the video projector 10 and the projection screen 20, an improvement in contrast performance in the presence of ambient light approaching a factor of two can be realized since essentially half of the unpolarized light will be blocked from entering the viewing room. For this case, the contrast ratio ($CR_3$) is mathematically described below in EQ. (3).

$$CR_3 = \frac{B_0 + \frac{B_3}{2}}{B_1 + \frac{B_3}{2}} \qquad (3)$$

However, a factor of two improvement is unlikely to be sufficient even for video conferencing, which requires the least amount of contrast for satisfactory operation as compared to other services employing large screen displays. In accordance with an aspect of our invention, a further significant improvement in contrast can be realized by polarizing the ambient light using polarizing lenses 30 in a direction orthogonal to the direction of polarization of the projected light. The polarization of the ambient light is described below in EQ. (4).

$$P = \frac{B_{3V} - B_{3H}}{B_{3V} + B_{3H}} \qquad (4)$$

$B_{3V}$ and $B_{3H}$ are the ambient light brightnesses that would be seen on the screen through ideal polarizing lenses admitting light polarized vertically and horizontally, respectively. When the two are equal, P equals zero, and when the light is vertically polarized, $B_{3H}$ equals zero and, P equals one. The brightness, $B_3$, due to the polarized ambient light is described in EQ. (5).

$$B_3 = B_{3V} + B_{3H} \qquad (5)$$

Because the polarizing lenses block the vertically polarized component of the ambient light, $B_3$ is to be replaced by $B_{3H}$ in EQ. (2). However, $B_{3H}$ can be expressed in terms of $B_3$ and P as given below.

$$B_{3H} = \frac{1-P}{2} B_3 \qquad (6)$$

The more general mathematical expression for the contrast ratio ($CR_4$) which applies when the ambient light is partially polarized as characterized by the parameter P is given below in EQ. (7).

$$CR_4 = \frac{B_0 + \frac{1-P}{2} B_3}{B_1 + \frac{1-P}{2} B_3} \qquad (7)$$

As a special case, $CR_4$ becomes equal to $CR_3$ when the ambient light is unpolarized, i.e. P=0.

Ideally, by implementing the polarizing lenses 30 such that only vertically polarized light is transmitted from the room light fixtures into the viewing room, thereby producing a polarization P equal to one, the full contrast ratio described in EQ. 1 and representing operation in darkened ambient conditions can be achieved even under undarkened ambient conditions. Practically, the polarization fraction P can be as high as 0.7 or more when the polarizing filter 30 comprises multiple layers of plastic.

Therefore, the front projection video display system, in accordance with our invention, can realize a contrast ratio improvement by a factor of six over the contrast ratio of video projector 10 operating in undarkened ambient conditions instead of a factor of two improvement realizable by only adding a polarizing filter between the video projector and the projection screen. A significant aspect of our invention is that the level of contrast performance attainable with our display system can meet contrast objectives within the industry of 30 to 1 and 50 to 1, for NTSC and HDTV, respectively, unlike conventional front projection systems which may not even be suitable for video conferencing requiring a 15 to 1 contrast.

CONCLUSION

A front projection video display system which achieves high contrast in undarkened ambient room conditions has been described. This system is comprised of components which cooperate with one another to maximize the projected image and minimize the effects of light radiated from lighting fixtures for improved contrast. The components of this systems include a front-projection video projector, which projects an image with a particular direction of polarization; polarizing lenses which polarize light radiated from room light fixtures in a direction orthogonal to that of the projected image; a polarizing filter which substantially transmits light polarized parallel to the projected image and substantially blocks light orthogonal to the projected image; and a projection screen which is polarization maintaining and which receives the projected image for viewing by the viewing audience.

Our system of cooperating components overcomes a major limitation of conventional front projection video display systems by alleviating the requirement for darkened ambient conditions. By obviating this limitation and inherently imposing little infringement on the volume of living space within the viewing room, our front projection system presents a viable alternative to rear projection systems which are undesirable due to their encroachment on living space.

Finally, numerous alternative embodiments of the present invention may be devised without departing from the spirit and scope of the following claims.

What is claimed is:

1. A front-projection video display system for obtaining high contrast in a viewing room without darkened ambient conditions comprising:
   a front-projection video projector, which projects an image in components, said projected image having an intensity and said components having substantially the same direction of polarization, wherein said front projection video projector produces a projected image comprising three components, a first and a second component having the same polarization and a third component being orthogonally polarized to said first and second components, and wherein said projector comprises a first half-wave plate for rotating said third component into agreement with said first and second components;
   a polarization maintaining projection screen for receiving said projected image from said video projector; and
   a polarizing filter located between said video projector and said projection screen, said filter being polarized in the same direction as said components of said projected image, wherein said polarization maintaining screen substantially preserves the intensity of said projected image on roundtrip between said polarizing filter and said screen.

2. The front-projection video display system of claim 1 wherein said components of said projected image and said polarizing filter are substantially polarized in the horizontal direction.

3. The front-projection video display system of claim 1 wherein the polarizing filter is tilted forward away from said projection screen to prevent bright reflections from being observed by viewers.

4. The front-projection video display system of claim 3 wherein the polarizing filter is anti-reflective.

5. The front-projection video display system of claim 1 wherein said polarizing filter follows the surface of the screen such that the surface reflections from said polarizing filter also form an image which is marginally displaced from the image formed by the surface of said screen, thereby suppressing undesirable effects of specular reflection from said polarizing filter.

6. The front-projection video display system of claim 1 further comprising
   polarizing lenses for covering light fixtures within a viewing room, said lenses being polarized orthogonal to said polarizing filter and said components of said projected image such that ambient light radiated from said light fixtures and polarized parallel to said polarized image is substantially blocked at said polarizing lenses and ambient light polarized orthogonal to said projected image is blocked at said polarizing filter for high contrast.

7. A front-projection video display system for obtaining high contrast in a viewing room without darkened ambient conditions comprising:
   a front-projection video projector which projects an image in components, said projected image having an intensity and said components having substantially the same direction of polarization, wherein said front projection video projector produces a projected image comprising three components, a first and a second component having the same polarization and a third component being orthogonally polarized to said first and second components, and wherein said projector comprises a first half-wave plate for rotating said third component into agreement with said first and second components;
   a polarization maintaining projection screen for receiving said projected image from said video projector;
   a polarizing filter located between said video projector and said projection screen, said filter being polarized in the same direction as said components of said projected image, wherein said polarization maintaining screen substantially preserves the intensity of said projected image on roundtrip between said polarizing filter and said screen; and
   polarizing lenses for covering light fixtures within the viewing room, said lenses being polarized orthogonal to said polarizing filter and said components of said projected image such that ambient light from the light fixtures and polarized parallel to said polarized image is substantially blocked at said polarizing lenses and ambient light polarized orthogonal to said projected image is blocked at said polarizing filter for high contrast.

8. The front-projection video display system of claim 7 wherein said projector further comprises a second half-wave plate for rotating said first, second, and third components to a particular polarization.

9. The front-projection video display system of claim 7 wherein said components comprise three different color sub-images.

* * * * *